(12) United States Patent
Drennan et al.

(10) Patent No.: US 11,684,045 B2
(45) Date of Patent: Jun. 27, 2023

(54) MOBILE INDOOR CONTROLLED APIARY SYSTEM

(71) Applicant: HiveTech Solutions Inc., Wilmington, DE (US)

(72) Inventors: Kimberly A Drennan, Boulder, CO (US); Justin T Bellucci, Boulder, CO (US); Chelsea Cook, Phoenix, AZ (US); Diana Glawe, Yellow Springs, OH (US)

(73) Assignee: HiveTech Solutions Inc., Wilmington, DE (US)

( * ) Notice: Subject to any disclaimer, the term of this patent is extended or adjusted under 35 U.S.C. 154(b) by 0 days.

(21) Appl. No.: 16/846,208

(22) Filed: Apr. 10, 2020

(65) Prior Publication Data

US 2020/0323177 A1  Oct. 15, 2020

Related U.S. Application Data

(60) Provisional application No. 62/832,254, filed on Apr. 10, 2019.

(51) Int. Cl.
*A01K 47/06* (2006.01)
*A01K 1/00* (2006.01)
*A01K 29/00* (2006.01)

(52) U.S. Cl.
CPC ............ *A01K 47/06* (2013.01); *A01K 1/0047* (2013.01); *A01K 29/005* (2013.01)

(58) Field of Classification Search
CPC ...... A01K 47/00; A01K 47/06; A01K 1/0047; A01K 29/005; A01K 1/03; A01K 1/032; A01K 1/033; A01K 1/034

USPC ................... 449/3, 6, 12, 26, 32, 34, 13, 15; 119/474, 498, 513
See application file for complete search history.

(56) References Cited

U.S. PATENT DOCUMENTS

| 74,065 A | * | 2/1868 | Faulkner | A01K 47/06 449/22 |
| 82,363 A | * | 9/1868 | Tallman | A01K 47/00 449/32 |
| 104,521 A | * | 6/1870 | White | A01K 47/00 449/26 |

(Continued)

FOREIGN PATENT DOCUMENTS

| CH | 515674 A | * 11/1971 | ............. A01K 47/00 |
| CN | 205865603 U | 1/2017 | |

(Continued)

OTHER PUBLICATIONS

English-language translation for ES 2391681 (Year: 2012).*

(Continued)

*Primary Examiner* — Kathleen I Alker
(74) *Attorney, Agent, or Firm* — Neugeboren O'Dowd PC

(57) ABSTRACT

A mobile indoor controlled apiary system includes a mobile foundation, a plurality of insulated panels configured for modular assembly to form a structural envelope on top of the mobile foundation, and a removable shell configured for covering the structural envelope. The system further includes a data collection system for gathering environmental data within the structural envelope, and a climate control system configured for regulating environmental conditions within the structural envelope.

15 Claims, 13 Drawing Sheets

(56) References Cited

U.S. PATENT DOCUMENTS

| | | | | |
|---|---|---|---|---|
| 109,702 A * | 11/1870 | Wood | A01K 47/00 | 449/26 |
| 204,549 A * | 6/1878 | Elder | A01K 47/00 | 449/39 |
| 319,979 A * | 6/1885 | Koch | A01K 47/00 | 449/26 |
| 460,219 A * | 9/1891 | Rutherford | A01K 47/00 | 449/26 |
| 620,859 A * | 3/1899 | Taylor | A01K 47/00 | 449/16 |
| 692,784 A * | 2/1902 | Hemple | A01K 47/00 | 449/26 |
| 1,871,595 A * | 8/1932 | Eldred | A01K 47/06 | 449/30 |
| 2,169,858 A * | 8/1939 | Turchenko | A01K 47/00 | 449/26 |
| 2,292,110 A * | 8/1942 | Evans | A01K 47/00 | 449/14 |
| 2,506,118 A * | 5/1950 | Taylor | A01K 47/06 | 449/2 |
| 2,600,194 A * | 6/1952 | Bennett | A01K 49/00 | 449/12 |
| 3,438,070 A | 4/1969 | Florance | | |
| 4,402,099 A * | 9/1983 | Platt, Jr. | A01K 47/00 | 449/15 |
| 4,983,139 A * | 1/1991 | Kretschmann | A01K 47/00 | 449/15 |
| 5,741,170 A * | 4/1998 | Orletsky | A01K 47/00 | 449/30 |
| 6,460,486 B1 * | 10/2002 | Powers | A01K 1/0245 | 119/452 |
| 8,602,837 B1 * | 12/2013 | Allan | A01K 47/00 | 449/27 |
| 2004/0077290 A1 * | 4/2004 | Bromenshenk | A01K 55/00 | 449/3 |
| 2010/0062683 A1 * | 3/2010 | Brundage | A01K 47/06 | 367/135 |
| 2010/0105282 A1 | 4/2010 | Mazemi | | |
| 2011/0195633 A1 | 8/2011 | Benincasa et al. | | |
| 2015/0084784 A1 * | 3/2015 | Suta | A01K 47/06 | 340/870.01 |
| 2016/0212976 A1 * | 7/2016 | Bulanyy | A01K 47/06 | |
| 2016/0353715 A1 * | 12/2016 | Temby | A01K 47/06 | |
| 2017/0064931 A1 | 3/2017 | Tagliaferri | | |
| 2017/0071169 A1 | 3/2017 | Benedetti et al. | | |
| 2017/0079249 A1 * | 3/2017 | Chapa | G01G 19/52 | |
| 2017/0360010 A1 * | 12/2017 | Wilson-Rich | A01K 47/06 | |
| 2020/0128796 A1 * | 4/2020 | Catalano | G06F 16/24573 | |
| 2020/0281167 A1 * | 9/2020 | Suntych | A01K 39/012 | |
| 2020/0334443 A1 * | 10/2020 | Symes | G06F 3/16 | |

FOREIGN PATENT DOCUMENTS

| | | | | |
|---|---|---|---|---|
| CN | 106912403 A * | 7/2017 | | A01K 47/00 |
| CN | 107223494 A * | 10/2017 | | |
| DE | 19512943 A1 | 2/1996 | | |
| DE | 102005028236 A1 * | 1/2006 | | A01K 31/005 |
| DE | 102012017966 A1 * | 3/2014 | | A01K 29/005 |
| DE | 202016105207 U1 | 10/2016 | | |
| ES | 2391681 A1 * | 11/2012 | | |
| FR | 1023091 A * | 3/1953 | | A01K 47/00 |
| KR | 880000001 B1 * | 2/1988 | | |
| KR | 100381383 B1 * | 4/2003 | | |
| KR | 20090122167 A * | 11/2009 | | |
| KR | 100969198 B1 * | 7/2010 | | |
| KR | 101880284 B1 * | 8/2018 | | A01K 47/06 |
| KR | 1020190038703 A | 4/2019 | | |
| RU | 2665078 C1 | 8/2018 | | |
| WO | 2018165051 A1 | 9/2018 | | |
| WO | WO-2019022596 A1 * | 1/2019 | | |

OTHER PUBLICATIONS

English-language translation of KR 20090122167 A (Year: 2009).*
Machine translation of CN 106912403 to Jiang, published Jul. 2017.*
International Search Report dated Jun. 26, 2020.
Written Opinion of the International Search Authority dated Jun. 26, 2020.
Forjaz, Alexandra, Partial Supplementary European Search Report for European Patent Application No. 20787234.2, completion date Dec. 15, 2022, dated Dec. 25, 2022, 9 pages, Pub. in: DE.

* cited by examiner

MOBILE INDOOR CONTROLLED APIARY SYSTEM

PRIORITY CLAIM

The present application claims the benefit of U.S. Provisional Patent Application Ser. No. 62/832,254, filed Apr. 10, 2019 and entitled "Mobile Indoor Controlled Apiary System," which application is incorporated herein by reference in its entirety.

GOVERNMENT RIGHTS STATEMENT

This invention was made with government support under Agreement Number 2018-33610-28619 awarded by the United States Department of Agriculture. The government has certain rights in the invention.

FIELD OF THE INVENTION

The present invention relates to apiaries and, more particularly, to apiary systems for promoting the health and wellbeing of bees.

BACKGROUND OF THE INVENTION

As the demand for pollination services increases, honey bees continue to suffer from population losses and complex health problems. During the past 20 years, the scientific community has attempted to solve this problem by, for example, reducing mite loads with new miticides, diminishing nutritional deficiencies with dietary supplements, and boosting the bee's immune systems using probiotics. However, none of these measures has produced long-lasting reductions of honey bee losses or increased honey bee health to the level that is needed for a stable and healthy honey bee population. For instance, the 2015-2016 annual colony loss survey reports that, between April 2015 and April 2016, beekeepers lost 40.5% of their colonies, with 27% being winter losses. Beekeepers across the United States lost 40.7% of their honey bee colonies from April 2018 to April 2019, according to preliminary results of the latest annual nationwide survey conducted by the University of Maryland-led nonprofit Bee Informed Partnership. The survey asked commercial and backyard beekeeping operations to track the survival rates of their honey bee colonies. Nearly 4,700 beekeepers managing 319,787 colonies from all 50 states and the District of Columbia responded to this year's survey, representing about 12% of the nation's estimated 2.69 million managed colonies. The solutions thus far have been implemented within the framework of conventional beekeeping practices. The lack of success in reducing colony losses strongly indicate that certain management practices need to change.

Varroa mites continue to be a major contributor to colony losses. Varroa mite populations grow exponentially from August until October during the colony's last brood cycle, as Varroa mites reproduce in brood cells. During the fall, honey bee colonies reduce brood production, causing mites to grasp onto adult workers. With increasingly warmer fall temperatures, bees are foraging for longer periods before cold weather discourages foraging activity and, consequently, mites are being transmitted between colonies as bees fly and rob honey from nearby colonies as late as December in some geographic regions. This phenomenon has effectively made the Varroa mite a migratory pest.

While summer losses at 24% are also an issue, honey bees coming out of winter unhealthy, not dead, may be contributing to summer losses later in the year. The survey results show, the annual loss of 40.7% this last year represents a slight increase over the annual average of 38.7%. However, winter losses of 37.7%, were the highest winter loss reported since the survey began 13 years ago and 8.9 percentage points higher than the survey average. One management strategy in particular relates to how colonies are overwintered, as even a ten-percent reduction in overwintering losses will result in an additional 250,000 colonies available for spring pollination.

Evolutionarily, the European subspecies of honey bees, which include most honey bee subspecies utilized in agriculture in the United States, evolved in temperate regions of Europe with cold winters. Thus, this subspecies of honey bees evolved an overwintering state, characterized by a reduction of brood production and foraging activity, as well as long periods of confinement to the hive.

Typically, colonies are treated for mites in the fall just prior to the winter months so as to reduce the number of mites present in the hives during the months in which the honey bees overwinter in the hives. In fact, while many commercial beekeepers are proactively treating for mites 4 to 6 times during the calendar year, studies have shown that such treatments can be ineffective and does not lead to significant reduction in mite load during overwintering due to multiple factors. For example, although the transition to the overwintering state is triggered by many social and environmental cues, a changing food and climate landscape has caused honey bees to forage and remain active later in the fall, thus disturbing this evolutionary adaptation.

In terms of modern honey bee management, indoor overwintering has been practiced for many years in Canada and small pockets of the United States. By housing bee colonies indoors for the winter months, the honey bees are prevented from foraging outside of the containment area, thus reducing the chance of exposure to Varroa mites. For example, in the United States, commercial beekeepers have been using potato barns in Idaho for overwintering since the 1980s. While these barns offered more stable temperatures than being outdoors, they were designed to store potatoes, not to provide conditions required to optimize honey bee health. More importantly, as ambient temperatures in these locations rise or become more extreme, these barns are becoming unsuitable for overwintering bees. As an example, rising temperatures inside these barns are requiring the installation of sprinklers and mechanical ventilation systems, which increase the costs of bee storage.

SUMMARY OF THE INVENTION

In accordance with an embodiment, a mobile indoor controlled apiary system includes a mobile foundation, a plurality of insulated panels configured for modular assembly to form a structural envelope on top of the mobile foundation, and a removable shell configured for covering the structural envelope. The system further includes a data collection system for gathering environmental data within the structural envelope, and a climate control system configured for regulating environmental conditions within the structural envelope.

In another embodiment, the data collection system gathers environmental data at a plurality of locations within the structural envelope. In a further embodiment, the climate control system is configured for controlling at least one of temperature, humidity, ventilation, and carbon dioxide levels within specified tolerances, in response to the environmental data collected by the data collection system. In still another embodiment, the specified tolerances are optimized for health conditions of bees contained within the structural envelope. In a still further embodiment, the specified tolerances are defined for providing at least one of preserving bee colony strength in cold months, reducing exposure to harmful pathogens, and ameliorating stress factors.

In still another embodiment, at least two of the insulated panels are interchangeable. In a further embodiment, the plurality of insulated panels is reconfigurable for assembly into structural envelopes of at least two different configurations In yet another embodiment, each one of the insulated panels is configured to be attachable to each other in a weathertight manner without additional attachment hardware. In another embodiment, the system is configured to be mobile so as to be repeatably assembled and disassembled. In a further embodiment, the removable shell is configured to be weather resistant. In another embodiment, the system further includes a plurality of straps for securing the structural envelope onto the mobile foundation.

DETAILED DESCRIPTION OF EMBODIMENTS OF THE INVENTION

Figure 1:
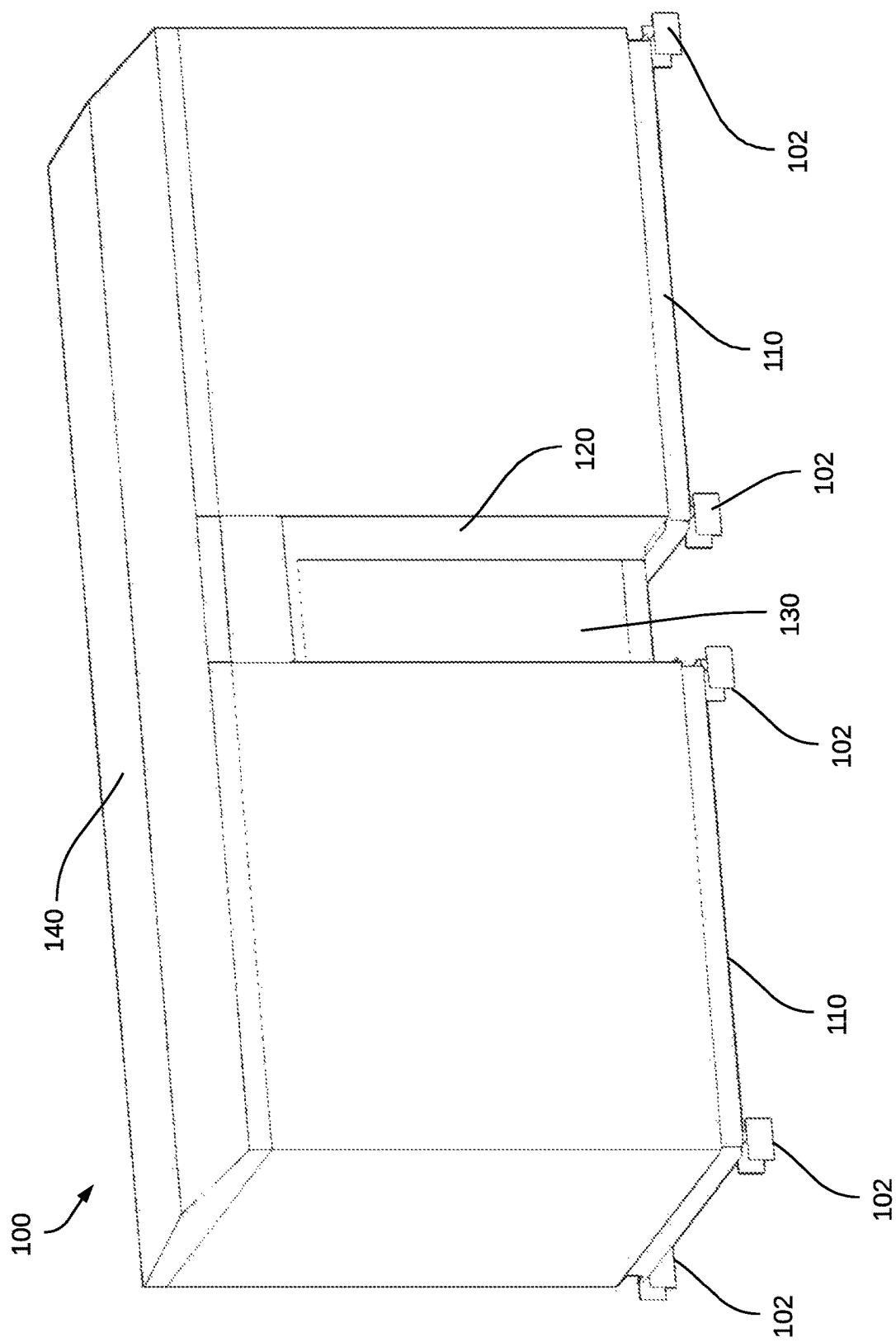
FIG. 1 illustrates an isometric view of a mobile indoor controlled apiary (MICA) system, in accordance with an embodiment.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Winter worker bees are physiologically distinct from their summer counterparts. Winter bees have more fat and protein in their bodies for survival and spring brood rearing, and they form a thermoregulatory cluster that collectively shivers to keep the colony warm and active. That is, a healthy winter bee colony exhibits specific temperature signatures that can be detected with strategically placed temperature sensors. Conversely, an unhealthy winter bee colony with, for example, a Varroa mite infestation can be detected using a sensor-based honey bee hive monitoring system. Additionally, the bee colony population size can also be extrapolated from information from various sensors.

The present disclosure describes embodiments related to providing a mobile, controlled, indoor environment for overwintering bees. Embodiments described herein are suitable for use in agriculturally dense areas, even with high land costs, for reducing load stresses caused by Varroa infestation. The mobile approach also greatly reduces the capital investment and time required for construction compared to building permanent, specialized structures for overwintering bees, and allows more options for the selection of ideal installation locations, such as on fallow lands leased from growers. Even during transport between pollination sites outside of the winter months, the embodiments described herein provides a cleaner, controlled, quieter environment for transport compared to traditional methods, for example, of loading stacks of hives directly on a flatbed truck. The embodiments described herein also allows beekeepers the option of selecting the time periods in which the hives are overwintered by providing a controlled environment suitable for overwintering, thus reducing costs of feed and miticide treatments.

As described hereinafter, a mobile indoor controlled apiary (MICA) is an environmentally controlled indoor apiary, which includes a foundation, a lightweight, panelized insulated structural envelope, a removable weather resistant shell, an heating-ventilation-air conditioning (HVAC) system that regulates temperature, humidity, ventilation, and carbon dioxide within specific tolerances, and a data collection system that assists in the optimization of the interior conditions for honey bee health.

The system is modular in design to allow for the aggregation of units over time or to create a range of environmental zones. The MICA system is configured to be easily transported, quickly assembled and disassembled such that the system can be implemented seasonally and easily stored when not in use. The MICA system provides an indoor habitat for honey bees that allows: 1) preservation of colony strength throughout the winter months; 2) reduction in exposure of the honey bees to stressors and harmful pathogens; 3) ready transportation to desired locations (i.e., bring the ideal overwintering conditions to the hive locations, rather than transporting the hives to a permanent structure such as a barn); 4) reduction in cost of hive maintenance and treatment, if necessary; and 5) a non-chemical method to interrupt the brood cycle by providing the ideal overwintering conditions to naturally reduce the brood cycle.

The MICA system creates and maintains an optimal climate range to encourage the clustering behavior of honey bees, which is a key feature of overwintering. The MICA system also includes one or more sensors for data collection, reporting, and management, such as temperature sensors to measure temperature distribution, humidity, and carbon dioxide levels. Optionally, the MICA system includes measurements of the system power consumption for use in optimizing the power draw or battery capacity to operate the system. Furthermore, by its modular nature, the MICA system can be configured in a variety of ways, such as juxtaposed zones with differing environmental conditions for accommodating different applications, including cold storage of crops during the summer months when the MICA system is not needed for bee colony overwintering uses.

Referring now to the figures, an exemplary embodiment of the MICA system is described. FIG. 1 shows an isometric view of a mobile, indoor controlled apiary (MICA) system 100, in accordance with an embodiment. MICA system 100 includes a plurality of feet arrangements 102 supporting mobile foundations 110. Optionally, feet arrangements 102 are adjustable such that MICA system 100 can be placed, for example, on uneven ground. MICA system 100 further includes a plurality of panels (not visible in FIG. 1) that form a structural envelope 120, creating a contained indoor environment therein. A door 130 provides access inside structural envelope 120. A cover 140 is placed over and around structural envelope 120 to provide additional weather resistance.

Figure 2:
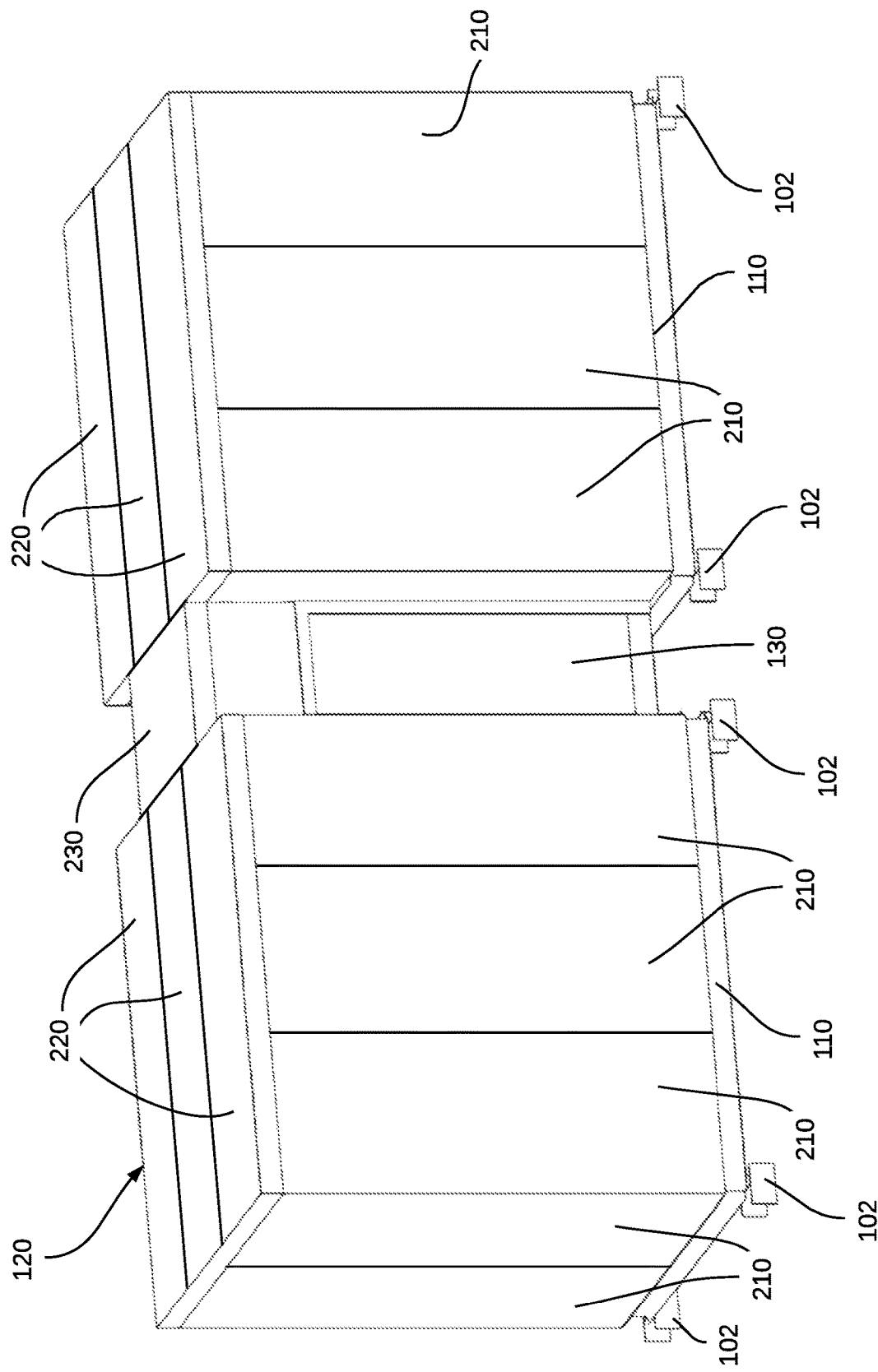
FIG. 2 shows an isometric view of the MICA system with its cover removed, in accordance with an embodiment.

Referring to FIG. 2, MICA system 100 is shown with cover 140 removed, thus showing details of various panels forming structural envelope 120. As shown in FIG. 2, a plurality of wall panels 210 form the vertical surfaces of structural envelope 120, while roof panels 220 and a connector panel 230 form the roof portion of structural envelope 120. In an embodiment, wall panels 210, roof panels 220, and connector panel 230 are insulated, lightweight panels that can be stored flat when not assembled. Optionally, wall panels 210, roof panels 220, and connector panel 230 are identical and interchangeable in a LEGO® brick fashion. Furthermore, multiple MICA systems can be connected together.

Continuing to refer to FIG. 2, wall panels 210, roof panels 220, and connector panel 230 are joined together using, for example, screws, pins, brackets, hook-and-loop connectors, straps, ratcheting mechanisms, and other suitable means. Additional interface components, such as weather stripping, gaskets and/or sealants, can be provided around at the panel connection interfaces such that wall panels 210, roof panels 220, and connector panel 230 are connectable in a weather resistant way. That is, when connected, wall panels 210, roof panels 220, and connector panel 230 do not allow, for example, moisture through the interfaces therebetween. The weather resistance of the panel connection interfaces is enhanced by the addition of cover 140, as shown in FIG. 1.

Figure 3:
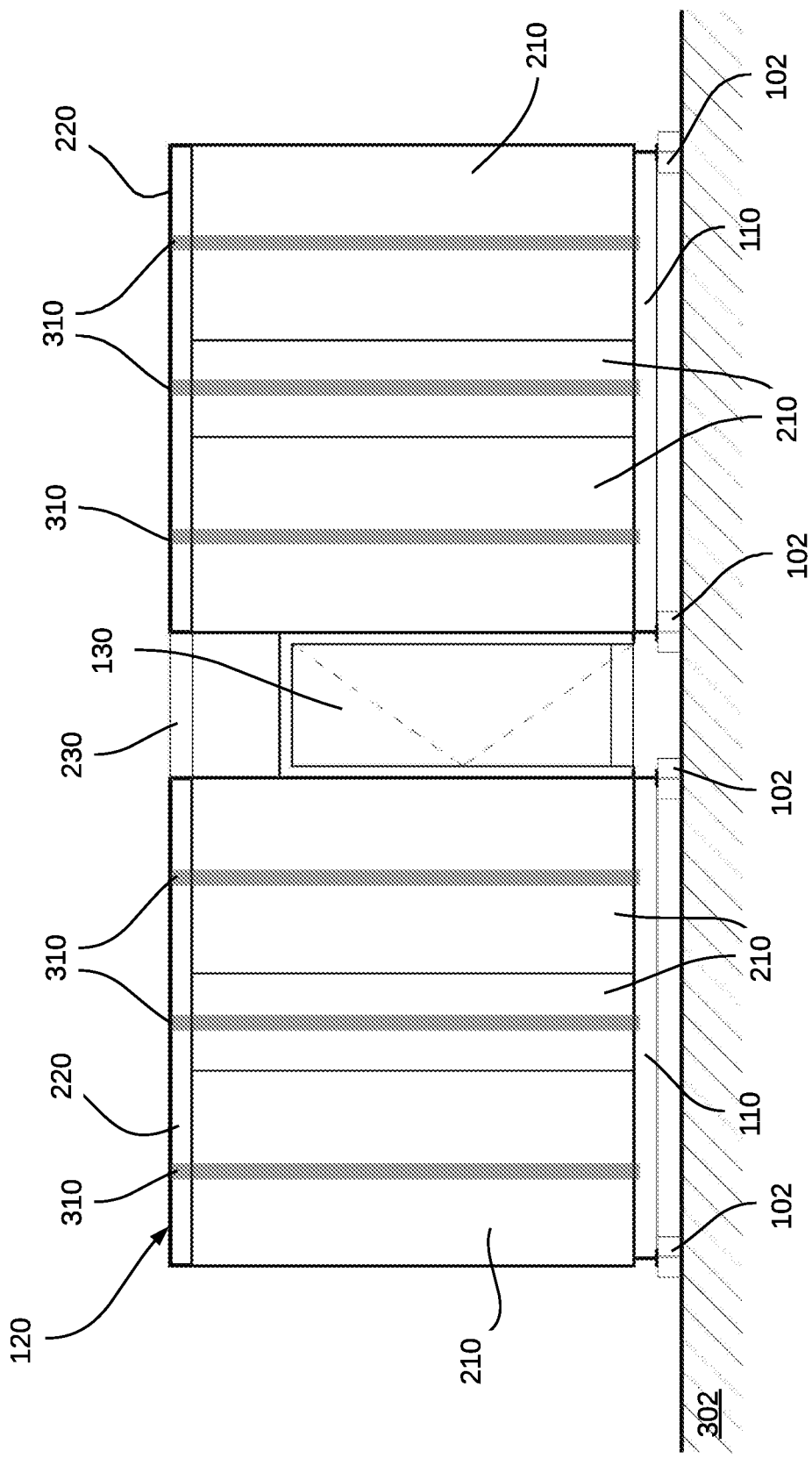
FIG. 3 illustrates a side view of the MICA system with its cover removed, shown here with straps attaching the structural envelope onto the mobile foundation, in accordance with an embodiment.

Referring now to FIG. 3, a front view of the MICA system is shown, illustrating a plurality of optional straps 310. Optional straps 310 provide additional structural stability to structural envelope 120. Additionally, straps 310 can be secured to foundation 110 to affix structural envelope 120 to foundation 110.

Figure 4:
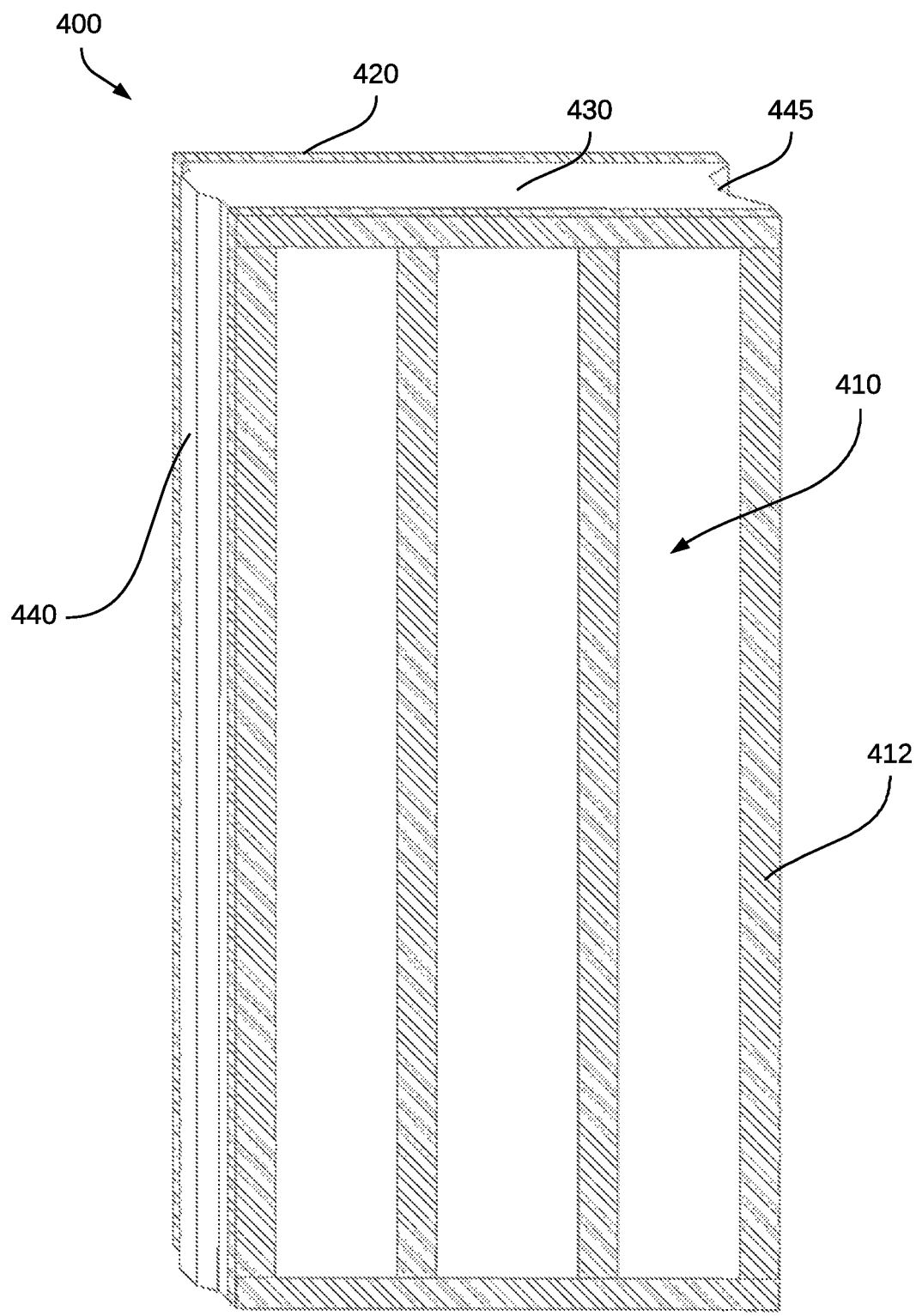
FIG. 4 illustrates an isometric view of one of the panels forming a structural envelope of the MICA system, in accordance with an embodiment.

An exemplary panel assembly 400 is shown in FIG. 4. As shown in FIG. 4, panel assembly 400 includes an external face 410, including a frame 412, and an internal face 420, separated by an insulating core 430. In an embodiment, insulating core 430 includes a tongue feature 440 and a groove feature 445 on opposing edges such that adjacent panels interlock. Lightweight metal frame 412 provides additional structural integrity.

Figure 5:
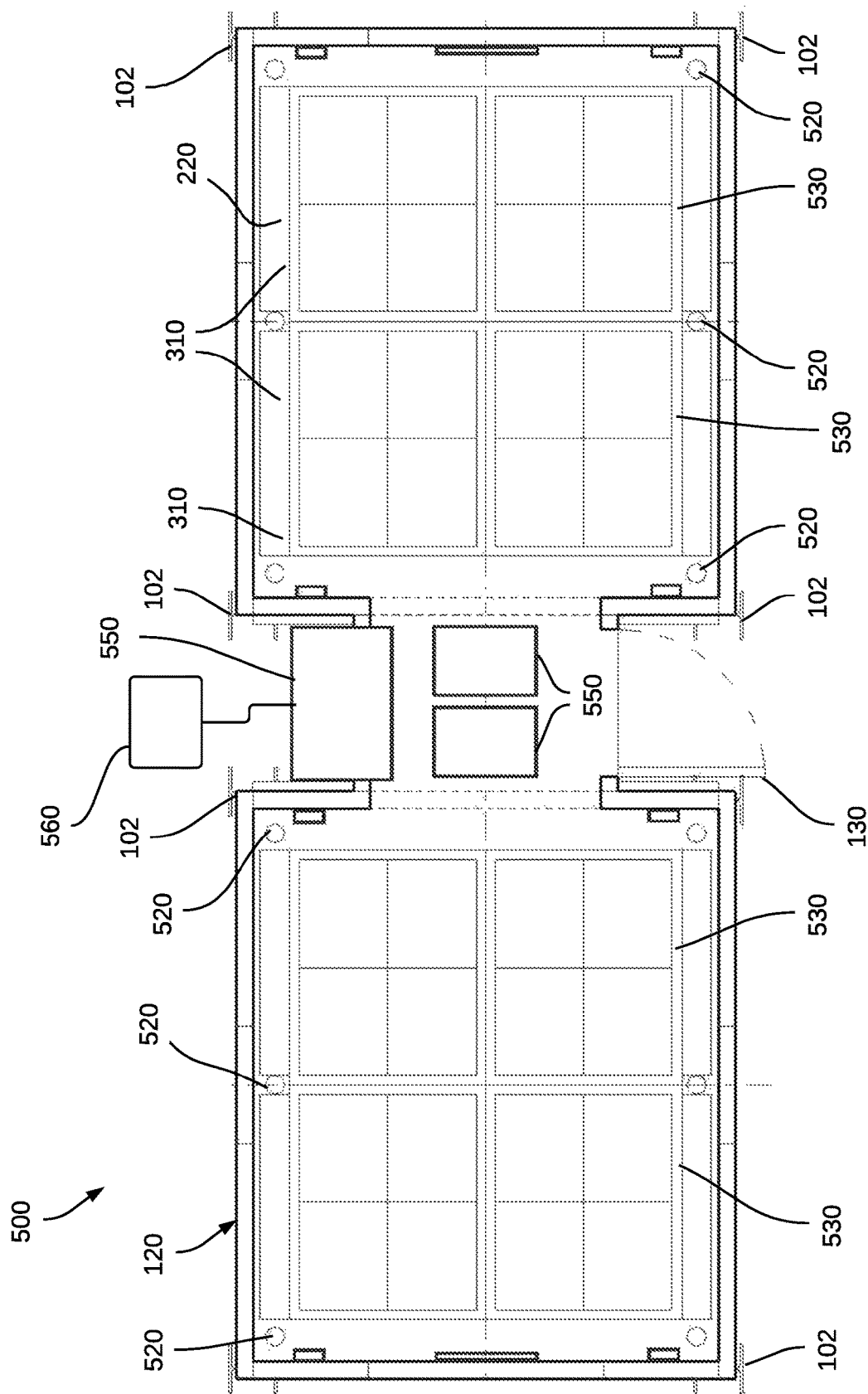
FIG. 5 illustrates a top, cutaway view of the MICA system, shown here to illustrate an exemplary placement configuration of hive boxes, sensors, and mechanical components within the MICA, in accordance with an embodiment.

Referring to FIG. 5, an exemplary embodiment of the internal arrangement of the MICA system is described. As shown in FIG. 5, a MICA system 500 includes a plurality of sensor 520 configured to collect data related to the environmental conditions around hives 530 stored within structural envelope 120. Sensors 520 are located at various locations around the perimeter of hive boxes 530 at different heights so as to provide data necessary to evaluate the health of the bee colonies within hive boxes 530. For example, sensors 520 can be configured for measuring temperature, humidity, carbon dioxide levels, or other environmental data within structural envelope 120. As described above, analysis of such sensor data can allow detection of mite infestations and other anomalies that can negatively affect the health of the bee colonies. Additional sensors placed outside of structural envelope 120 can be used to help identify possible correlations between external environmental conditions and bee colony health.

In an example, the data is gathered in multiple hive boxes supported on pallets by gateway units used as sensors 520. The gateways, for instance, are solar powered or can be directly connect to an AC power source. In an example embodiment, the gateway has a power and data line directly plugged into the MICA to allocate and transmit data from each hive box to the cloud. This data transmission can be, for instance, DC powered with conversion from AC. Each gateway collects and transmits the data through, for example, a cellular modem, a satellite link, a wired network, and/or a WiFi connection. The multiple gateways can be arranged in a preset configuration, such as arranged in a row on a sensor bar, which can be installed on each hive box. Data from each hive box can then be used as input to a control mechanism to adjust the environmental conditions within structural envelope 120.

Additionally, a HVAC system components 550 provides environmental within structural envelope 120. HVAC system components 550 are controlled by a controller 560 such that, based on data collected by sensors 520, controller 560 adjusts the output of HVAC system components 550 to manipulate various environmental conditions within structural envelope 120 to within ideal ranges, in an example. For instance, controller 560 is programmed with logic algorithms that determine the health condition of the hives based on the collected environmental data and adjust the output of HVAC system 550 to bring the internal environment within structural envelope 120 to optimal levels.

As an example, honey bees generally exhibit overwintering behavior when the temperature around the hive drops below 10° C. Therefore, the temperature within structure envelope 120 should remain, for instance, in the 5° C. to 6° C. range for the bees to remain in overwintering conditions. Also, the humidity should be controlled to be less than 65% relative humidity within structural envelope 120 to discourage the growth of mites and other parasitic organisms. Alternatively, the temperature within structure envelope 120 is kept around 4° C., with a relative humidity range of 45 to 80%, or below dewpoint. If "smart hives" with internal sensor mechanisms are used as hives 530, controller 560 can be configured for further taking into consideration the measurements taken at the individual hive level to adjust the internal environmental conditions within structural envelope 120. HVAC system components 550 includes, for instance, a combination of an heating unit, a cooling unit, a ventilation unit (e.g., energy recovery ventilator (ERV) unit), humidifier, dehumidifier, condensate pump, fans, radiant heater, and/or other means of regulating the temperature, humidity, and air flow within the structural envelope. The cooling unit, for example, is an 8,000 BTU air conditioner with a cooler controller for cooling the air within the MICA system to 7.2° C. Alternatively, refrigeration AC units can be used for further flexibility in achieving lower temperature settings. Airflow can be distributed via fans or through ductwork (not shown).

As an example, additional features, such as heat tape applied at the exit of the condensate drain pipe, insulated pipes, cold-resistant couplings, and others, are used to protect the HVAC system in harsh environments, such as in high humidity and extremely cold climates. In an embodiment, the ERV is configured to introduce outside air into the structural envelope only if the carbon dioxide level rises above a specified threshold. In an embodiment, the ERV flow rate is used to modulate the temperature within the structural envelope in emergencies (e.g., heating/cooling system failure) or if there is sufficient temperature gradient present between the outdoor conditions and the conditions within the structural envelope, such that the ERV acts as an economizer, thus providing climate control more efficiently than using the heating/cooling systems. Screens or filters can optionally be added to the air intake within the MICA system to prevent bees from getting pulled into the HVAC system. The heating unit is, for example, a gas heater, an electric heater, a ceramic panel heater, or a combination thereof.

In an example, sensors 520, optional smart hives, HVAC system components 550, and controller 560 are configured to run off of standard 120V power drawn from the standard power grid. Alternatively, other power sources, such as solar, wind, and/or battery can be used to power the components of the MICA system. Power can be supplied to the MICA system by, for example, standard 120V/60 Hz circuitry, 240V AC, 1- or 2-phase 40 Amp circuits, battery power, solar panels, generators, and other power supply means. Optionally, redundancy can be built into the MICA system by, for example, providing backup sensors, a secondary HVAC system (not shown), a backup power source (not shown), backup control systems, backup logic, and other failure mitigation arrangements. In one example, the sensors are powered by one backup power system (e.g., battery system), while the HVAC system is on a second backup power system (e.g., fueled generator) in order to maintain data collection even if the HVAC system fails.

Controller 560 is configured to coordinate operations between sensors 520 and HVAC system components 550. In an example, controller 560 contains logic to allow remote control and monitoring of the mechanical components, such as via cellular, satellite, wired, and other appropriate communications means. Controller 560 also controls relay switches that allow on/off power control of the various mechanical components. For example, the controller includes logic to coordinate operation of mechanical components and sensors to monitor loads on the various components, and collects operational data to inform future design decisions (e.g., determine whether the installed components and backup systems adequately sized, correctly configured and distributed within the MICA system).

Figure 6:
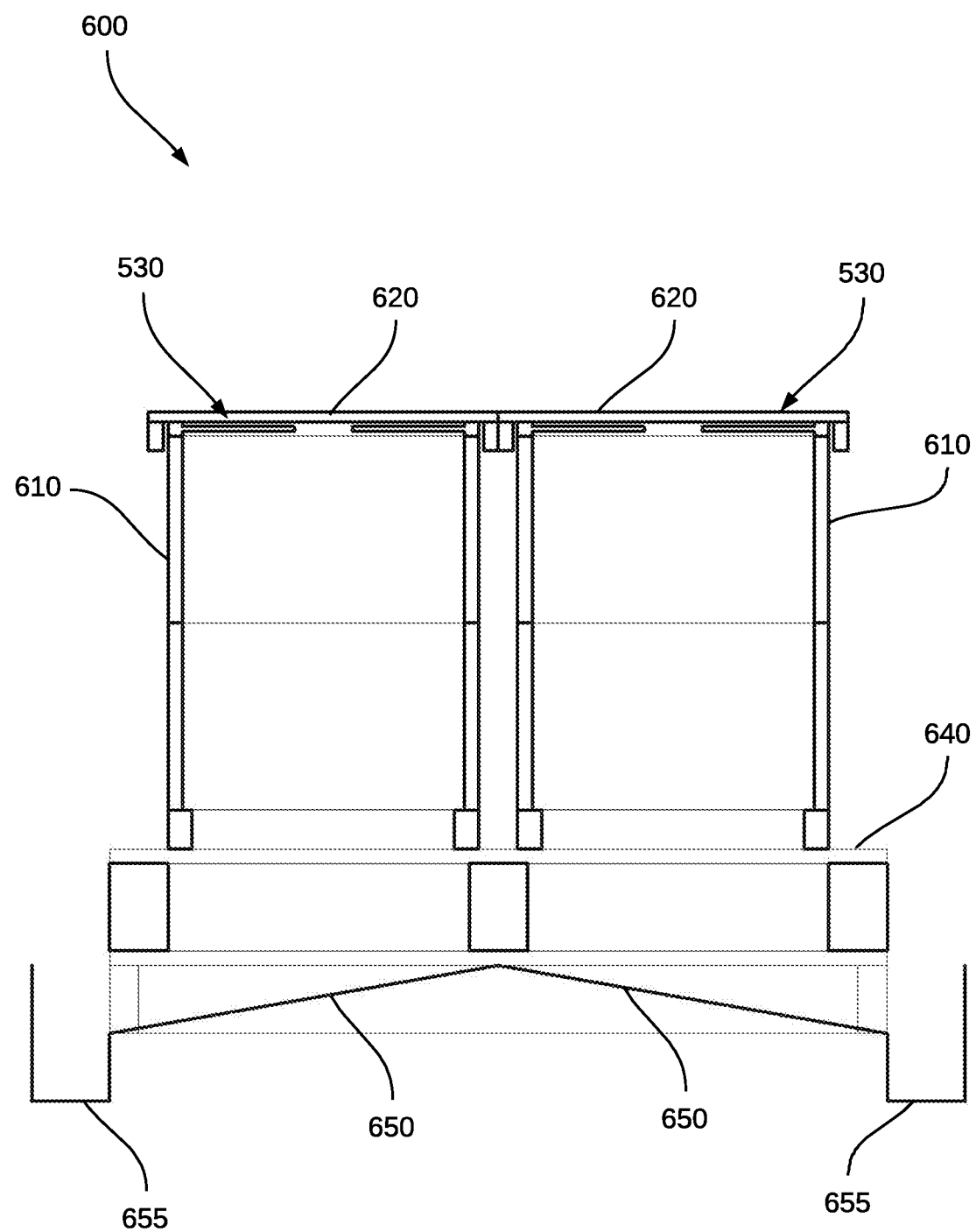
FIG. 6 illustrates a cross-sectional view of a pallet of hive boxes, in accordance with an embodiment.
Figure 7:
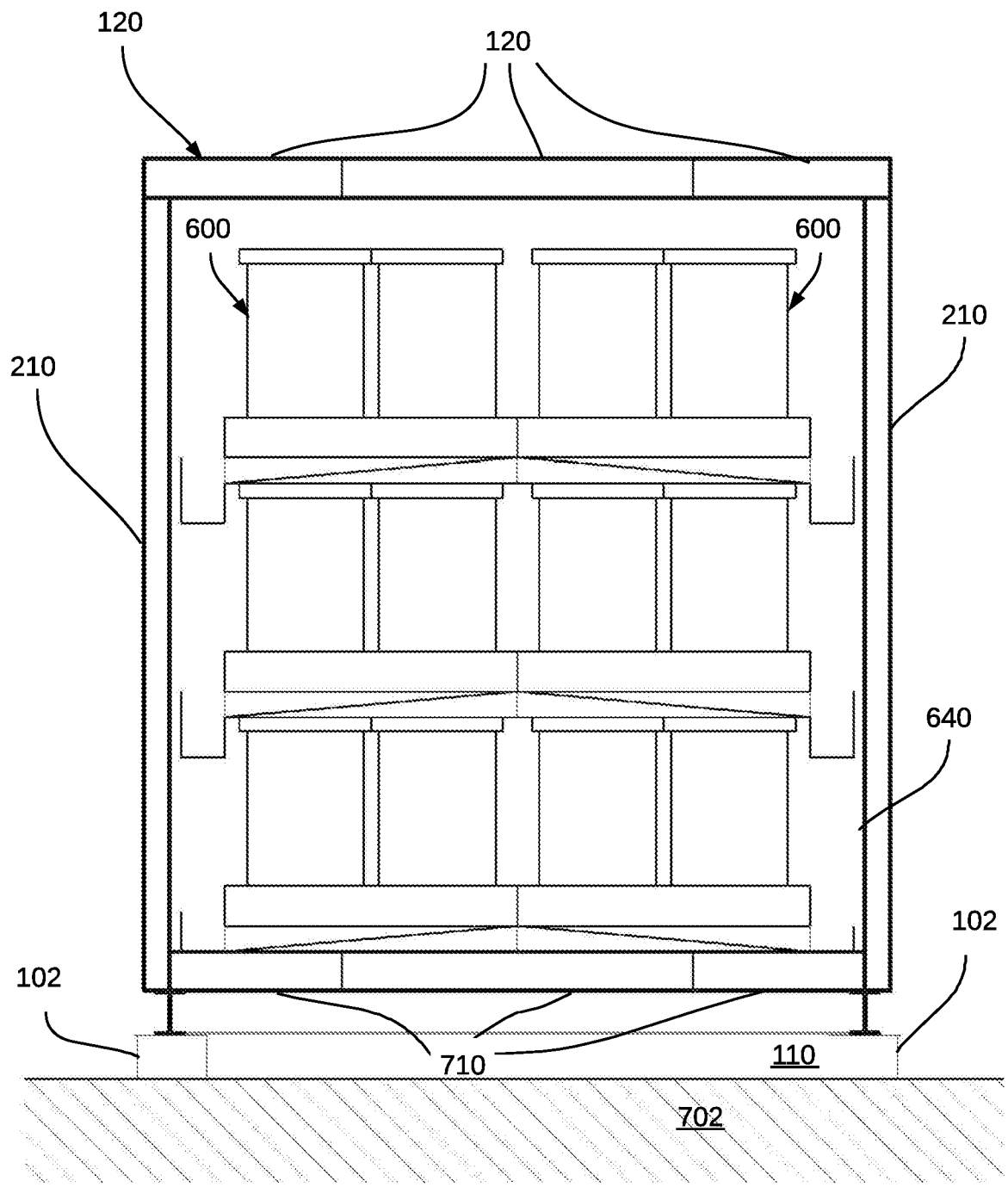
FIG. 7 illustrates an end, cutaway view of the MICA system, shown here to illustrate an exemplary stacking configuration of pallets of hive boxes.

FIG. 6 illustrates a cross-sectional view of a pallet of hive boxes, in accordance with an embodiment. As shown in FIG. 6, a pallet system 600 includes two hive boxes 530, including outer frames 610 and removable lids 620, supported on a pallet 640. Outer frames 610 and pallet 640 are configured to allow dead bees and debris to drop to slopes 650 such that dead bees and debris are collected in gutters 655. The dimensions of pallet system 600 are configured such that multiple pallet systems are stackable, as shown in FIG. 7. In FIG. 7, floor panels 710 forming the floor of structural envelope 120 are also visible. In an embodiment, floor panels 710 are interchangeable with at least one of wall panels 210 and roof panels 220 for ease of assembly.

Figure 8:
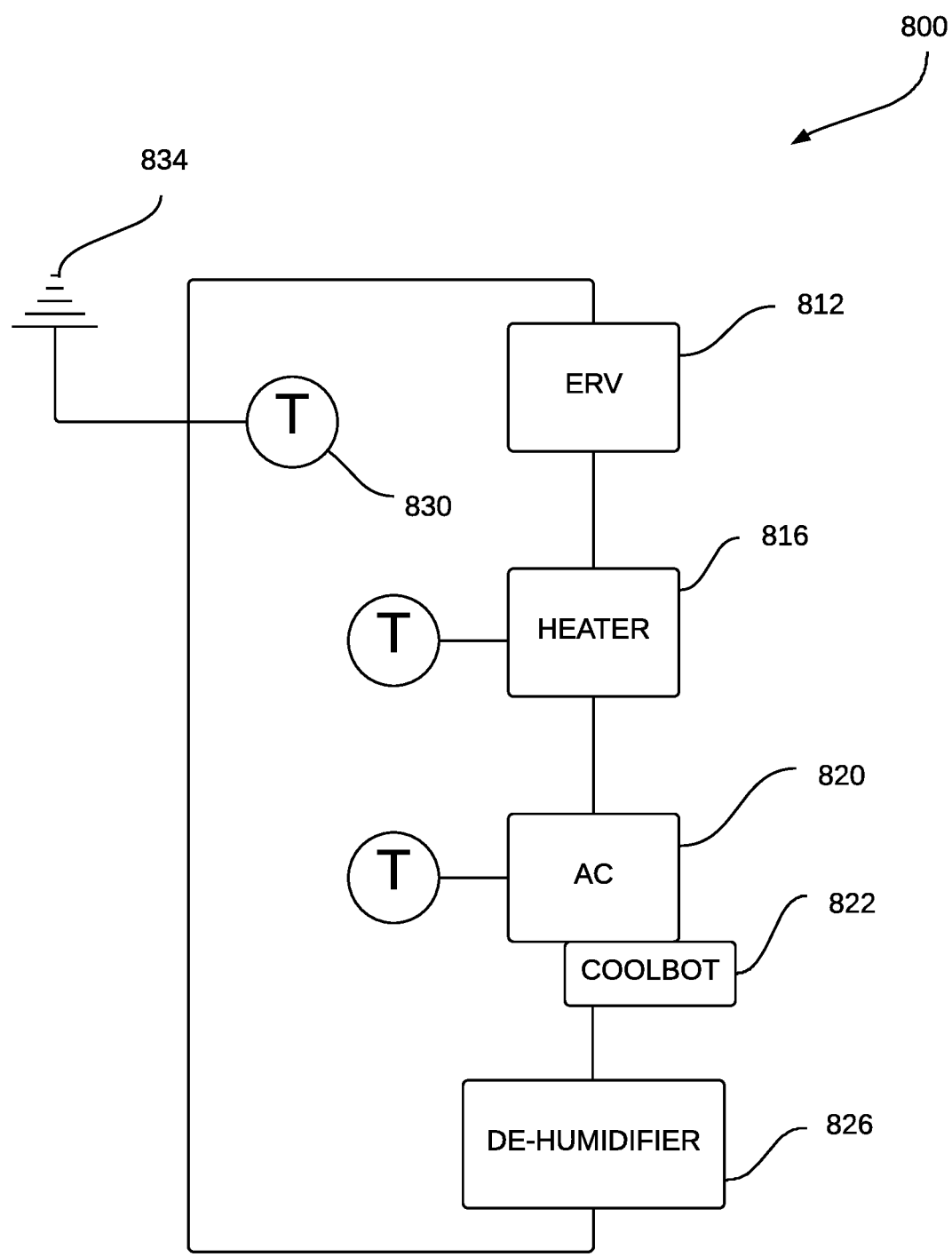
FIG. 8 shows a schematic of an exemplary configuration of an environmental conditioning system, in accordance with an embodiment.

FIG. 8 shows a schematic of an exemplary configuration of an environmental conditioning system, in accordance with an embodiment. In the embodiment shown in FIG. 8, the environmental conditioning system includes an ERV, a heater, an air conditioning system with a cooler controller attachment, and a dehumidifier. In the present example, the ERV is set for continuous operation, the heater is set to turn on when the temperature measured at a temperature sensor (represented by a circle-T symbol) is less than 5° C. The air conditioning system is set for continuous operation to maintain the internal temperature within the structural envelope at 6.1° C. The dehumidifier is set to operate continuously to maintain the humidity within the structural envelope at a low humidity condition, such as less that 65% relative humidity, which is suitable for bee health. Alternatively, as stated above, the air conditioning system is preset to keep the temperature within the structure envelope at around 4.4° C., and the dehumidifier operates to maintain the relative humidity range of 45%-80% or below dewpoint.

Figure 9:
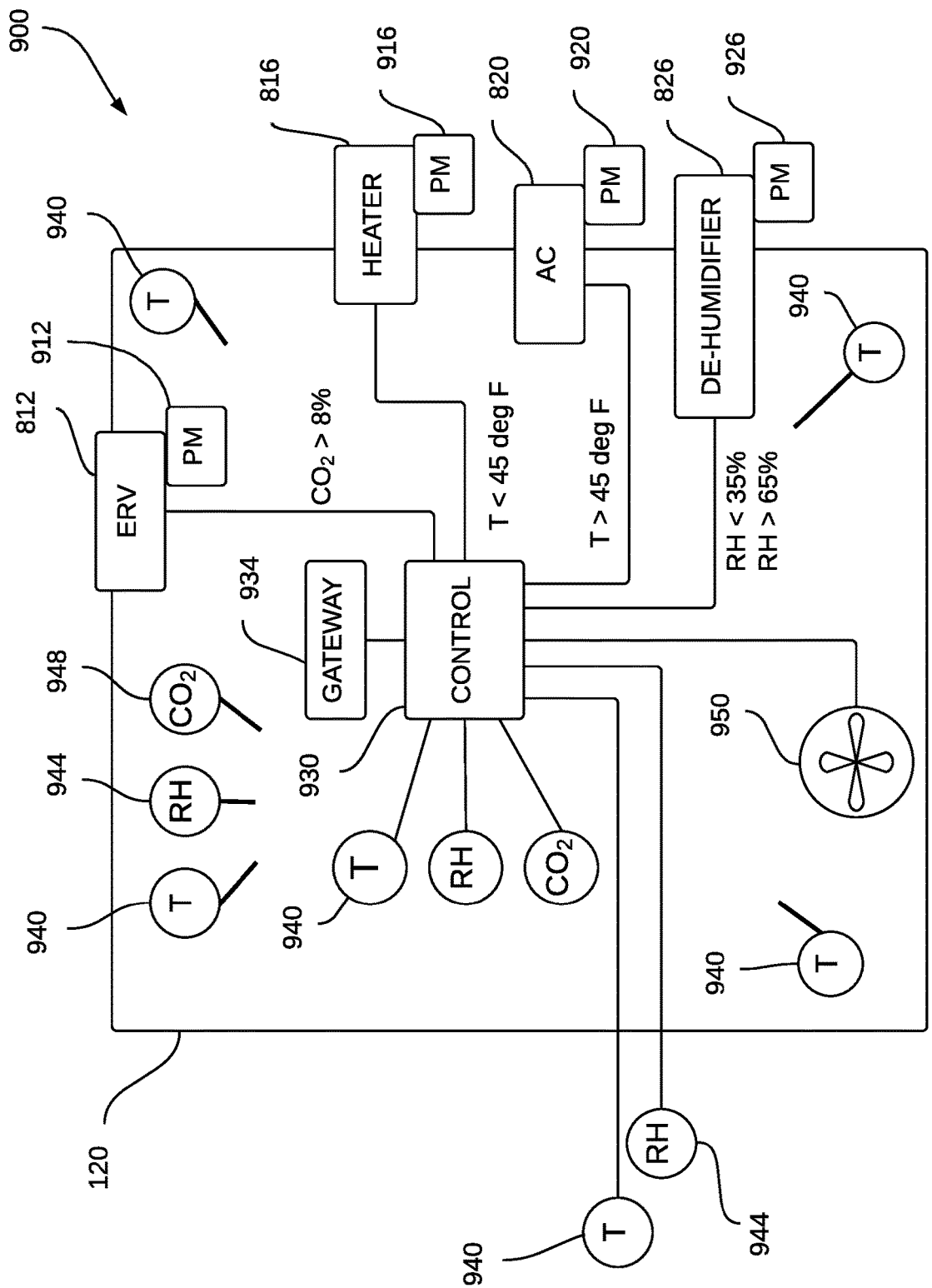
FIG. 9 shows a schematic of another exemplary configuration of an environmental conditioning system, in accordance with an embodiment.

FIG. 9 shows a schematic of another exemplary configuration of an environmental conditioning system, in accordance with an embodiment. The environmental conditioning system of FIG. 9 includes additional sensors, such as carbon dioxide sensors (represented by a circle-CO2 symbol) and relative humidity sensors (represented by a circle-RH symbol), a central controller, a gateway system, a fan system, backup logic, and sensors placed inside and outside the structural envelope to more finely tune the environmental conditions.

In an embodiment, the MICA system is designed to withstand use by commercial scale beekeepers. For instance, the feet arrangement, mobile foundation, and panels are configured to be lightweight and insulated such that the structural envelope can be assembled and disassembled (e.g., flat packed) at the selected installation location. In an example, the MICA system is designed to be installed in the field by two people within a four-hour time period. In an embodiment, the overall dimensions of the disassembled system meet cargo standards for road transportation. In an embodiment, the mobile foundation supports 150 pounds per square foot (psf), while the roof panels, when assembled, supports 80 psf. Ideally, the connections between all panels are weathertight. In an embodiment, one or more of the wall panels are removable even after assembly of the structural envelope so as to allow pallet loading of hives into the MICA system with, for example, a forklift. The weather resistant cover can be attached, for example, by a zipper, hook-and-loop attachment, screws, brackets, elastic cords, hooks, clips, snaps, buttons, or other connective assemblies.

In general, the design of the mobile, climate controlled apiary is intended to create a suitable habitat for honeybees during times of inclement environment conditions and during periods where reducing colony activity is required. The system functions as a temporary barrier from unsuitable or difficult environmental conditions. To meet the specific needs of beekeepers while optimizing the health, security, and comfort of their honey bees during difficult times of the year, a modular cold storage option such as the MICA system is desirable. Modular cold storage solutions put beekeepers in control; they are an option for beekeepers who want to avoid the stress of transportation or risk of large cold storage facilities. Specifically, the desired features are:

1) Modular design: The MICA system is formed of a bee storage subunit and a mechanical subunit that controls the environment that the bees are kept.

2) Scalable: the MICA system is scalable to fit any beekeeping operation and grow as a beekeeping operation grows.

3) Specific environmental control system design: Honey bees are very different from refrigerated produce. Like any living creature, they need a comfortable environment that can provide reliable heating, cooling, fresh air, and proper humidity in order to thrive. The MICA system has controllable set points for temperature, humidity, and CO2 to keep bees comfortably chilled in any climate zone. Environmental conditions are constantly monitored and controlled remotely.

4) Power: The MICA system plugs into a standard 240V outlet. A back-up generator with an automatic remote start option can power the unit in the event of power loss. Every component has a redundant system and backups in case of failure. Solar power with battery backup is available for remote locations. The unit can be quickly disassembled if bees need to be removed fast.

5) Timing: Beekeepers are in control of when their bees go into cold storage within the MICA system, and can place them in different yards at different times—after they have collected enough food for the winter and/or before mites become a problem.

6) Location: With the MICA system, beekeepers decide where their bees overwinter: It can be placed in all weather conditions and it runs off of a standard 240V outlet, backed up with a generator.

7) Construction: The MICA system can be constructed easily by two people and basic tools within a day. It can be constructed on the ground or on a trailer.

8) Cold storage transportation: The MICA system is a modular cold storage unit created to give honey bees a stable winter environment. Cold storage transportation benefits include: 1) Reduced temperature stress on colonies and queens; 2) More flexible loading and unloading logistics for beekeepers, as the MICA unit can be staged in holding yards, allowing beekeepers to unload in small batches when the weather is favorable; and 3) Pallets are kept clean during overwintering, reducing the time of inspection at state inspection locations when required.

9) Additional uses for a modular cold storage unit: The MICA system is well-suited to put bees into short-term cold storage to induce a brood break to increase efficacy of miticides. Additionally, since this unit brings a controlled environment to the field, therefore can be used to rapidly cool and store produce post-harvest, especially for small farmers. Further, the MICA system can be used for storage of tools, boxes, and potentially bee or other livestock feed The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, the MICA system can be run using a completely remote power supply such that it can be operated off-grid. The MICA system can include feeding/treatment systems to automatically provide tailored feeding and treatment to individual hives, if necessary. An active cleaning system can be incorporated into the structural envelope to facilitate the maintenance of a clean environment within the MICA system.

Figure 10:
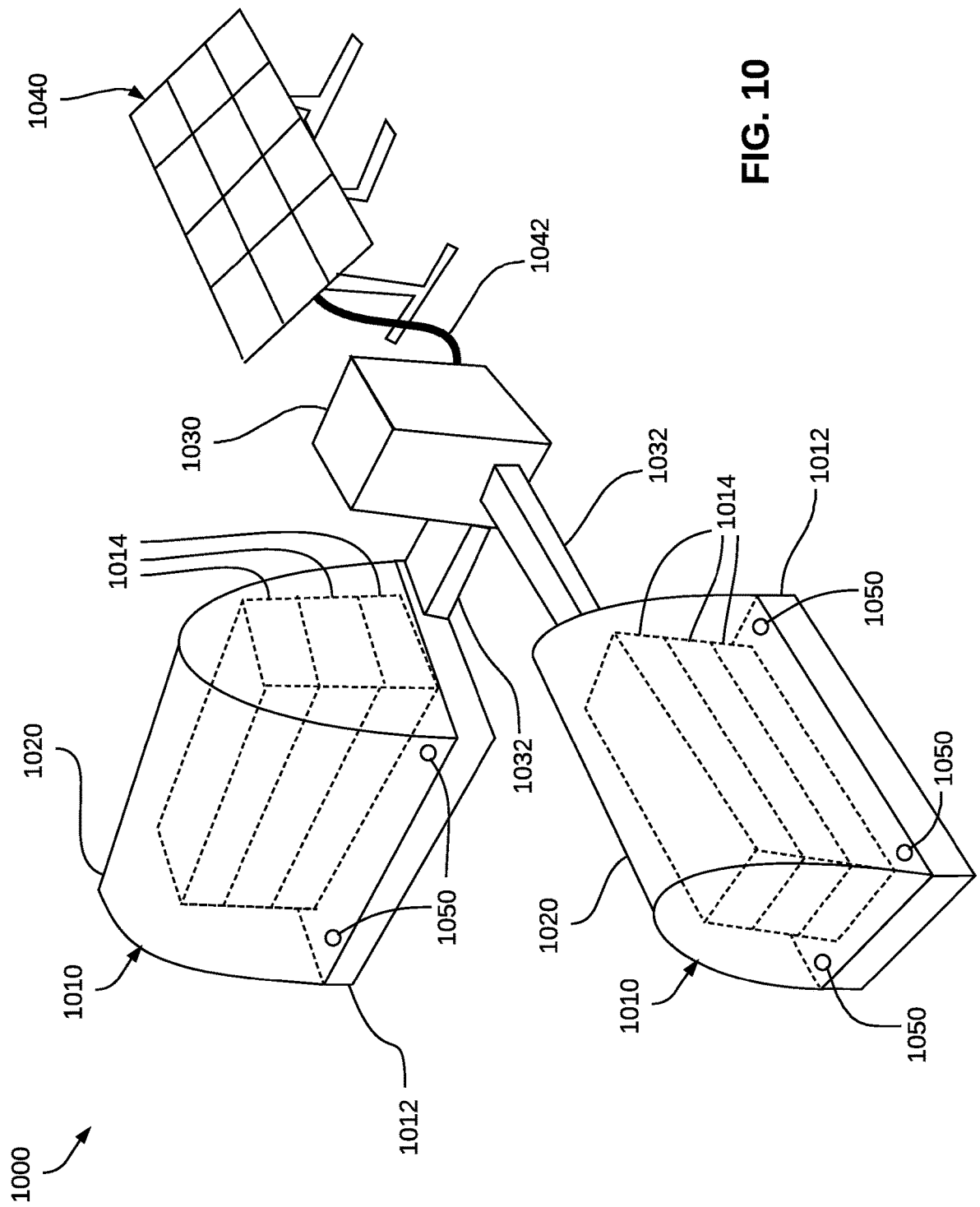
FIG. 10 shows a schematic of another exemplary embodiment of a "pop-up" version of the MICA system.

FIG. 10 shows a schematic of an even more mobile, "pop-up" version of the MICA system, in accordance with an embodiment. As shown in FIG. 10, alternative MICA system 1000 includes one or more pop-up systems 1010 (two are shown in FIG. 10). Each pop-up system 1010 includes a portable floor 1012, configured for providing a solid foundation on which to support one or more hive boxes 1014 off of uneven, irregular, wet, and/or unstable ground. Portable floor 1012 is also configured for supporting an inflatable shell 1020 thereon to protect hive boxes 1014 from the environment while providing a structural envelope for pop-up system 1010. Portable floor 1012 and/or inflatable shell 1020 are configured to cooperate with an HVAC system 1030, which is connected via ducting 1032 to each one of pop-up systems 1010.

Still referring to FIG. 10, HVAC system 1030 is configured for supporting one or more pop-up systems to provide centralized sensor monitoring and environmental control for the pop-up systems connected thereto. Furthermore, HVAC system 1030 is designed to provide sufficient pneumatic pressure to keep each inflatable shell 1020 inflated around hive boxes 1014. HVAC system 1030 is powered, for example, by an external power source, such as a solar panel system 1040 or generator (not shown), via a power connection 1042. In this way, pop-up system 1010 can be a passive system with no electronic power, in accordance with an embodiment. Alternatively, portable floor 1012 and/or inflatable shell 1020 is equipped with battery or generator power source or connectable with an external power source (e.g., a power grid, or an off-grid source, such as an external generator, solar panels, wind power, etc.).

In an embodiment, portable floor 1012 and/or inflatable shell 1020 includes internal electrical and/or ductwork to connected with HVAC system 1030. As an example, portable floor 1012 includes a plurality of sensors 1050 integrated therein to measure a variety of environmental parameters such as temperature, air pressure, and humidity. Additional functionality, such as shock or vibration sensors and a global position system (GPS), can also be integrated into portable floor 1012 and/or inflatable shell 1020. Similarly, HVAC system 1030 is equipped with communication capability (e.g., cellular communications, satellite communications, and/or wireless network connectivity) so as to communicate its status to a system administrator located away from alternative MICA system 1000, in an embodiment.

Alternative MICA system 1000 has the advantage that the system can be deployed where the hives are already located. That is, alternative MICA system 1000 can be deployed directly at whatever agricultural setting the hive boxes are kept, such as in an orchard. Further, pop-up system 1010 and HVAC system 1030 are portable to enable deployment in remote areas that may not be accessible by a semitruck, as would be required for the larger MICA system 100 shown in earlier figures.

Figure 11:
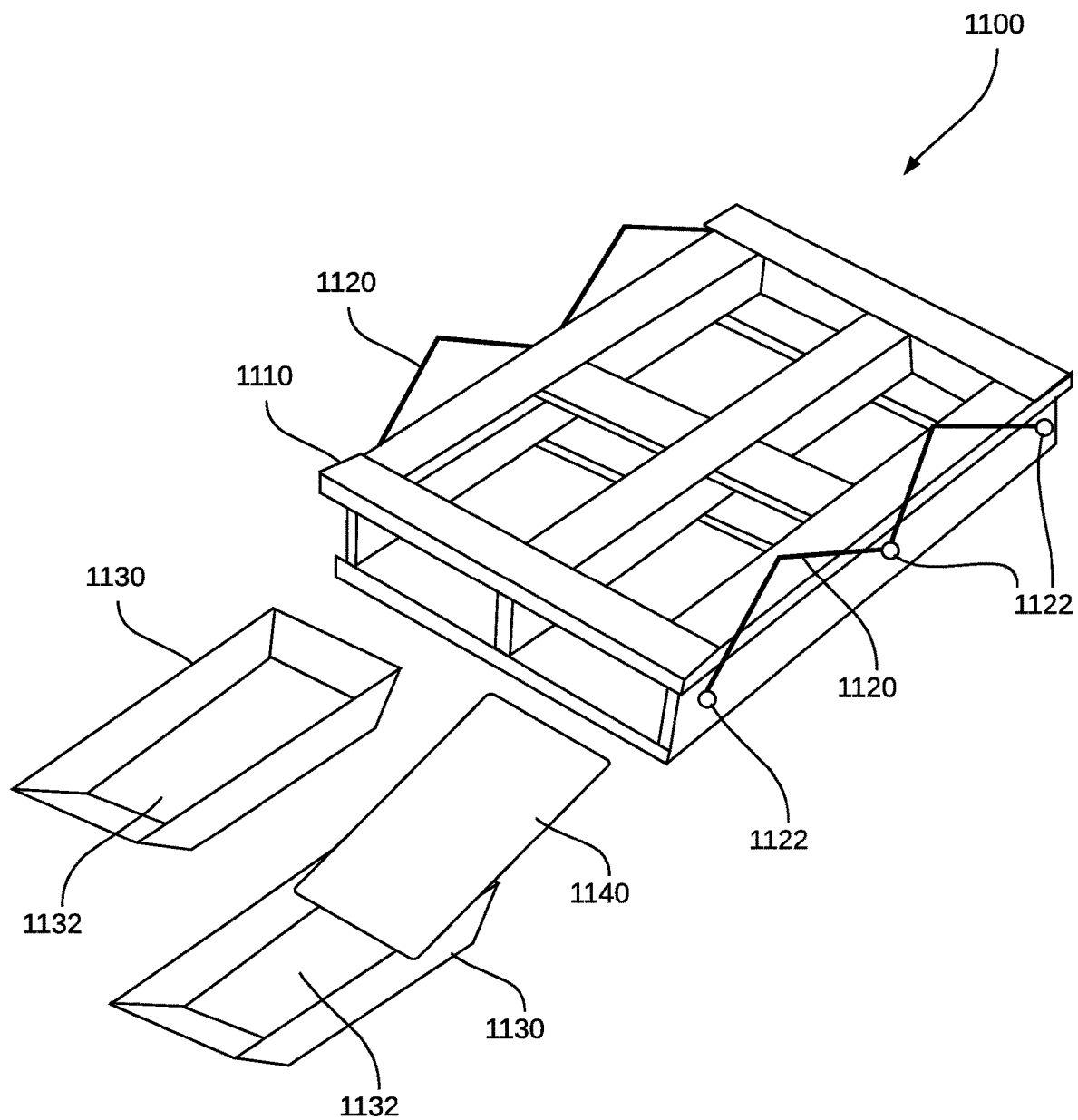
FIG. 11 shows a schematic of a palette system suitable for use with bee keeping application, in accordance with an embodiment.

Turning to FIG. 11, a schematic of a palette system suitable for use with bee keeping applications is shown, in accordance with an embodiment. A palette system 1100 includes a palette 1110. Palette 1110 can be, for example, a standard palette used in freight transportation or a specialized palette specifically dimensioned for hive boxes. Palette 1110 includes cords 1120 secured to palette 1110 by attachments 1122. Cords 1120 is formed, for example, of wire, rope, braided cord, or other thin, strong cordage. Cords 1120 provide ways to secure the straps (not shown) used to tie down the hive boxes onto palette 1110, rather than having to pass the tie down straps all the way around the hive boxes and the boards that form the palette. Palette system 1100 further includes one or more trays 1130, which are configured for insertion into palette 1100 beneath the hive boxes, in an embodiment. Trays 1130 are shaped for catching debris and dead bees that fall out of the hive boxes. Additionally, trays 1130 can be flipped over from the orientation shown in FIG. 11 such that bottom surface 1132 becomes the bottom board of a hive box, essentially sealing the bottom of the hive box, while the hive boxes are placed in the field during warm months. Trays 1130 is formed, for example, of a compostable material, such as cardboard or a compostable plastic, or another material such as wood, metal, or plastic. Optionally, one or more removable bottom board 1140 can be inserted on top of trays 1130 or on top of palette 1110 so as to serve as the bottom board of the hive box, without flipping over tray 1130.

A variety of modifications, such as in the refrigeration, heating, ventilation, and dehumidification load requirements for particular installation scenarios of the MICA are possible. For example, the seal provided by structural envelope 120 of FIG. 1 is more crucial in certain climates than in others (e.g., overwintering of bees in frigid conditions in Canada would require higher integrity in the structural envelope than in Texas). Similarly, more stress would be placed on performance of the dehumidifier in high humidity environments, rather than in more temperate climates. Specifically regarding humidity, for example, it would be ideal for the health of the bee colonies if the humidity level within the MICA system is kept below the dewpoint at a particular installation location to avoid the formation of condensation within the hive boxes. In some cases, adjusting the system to accommodate higher or lower due points is more important than simply adjusting the internal humidity setting based on relative humidity measurements in order to avoid condensation within the hive boxes. The HVAC requirements of the MICA can be adjusted to accommodate the climate conditions at specific installation sites.

Figure 12:
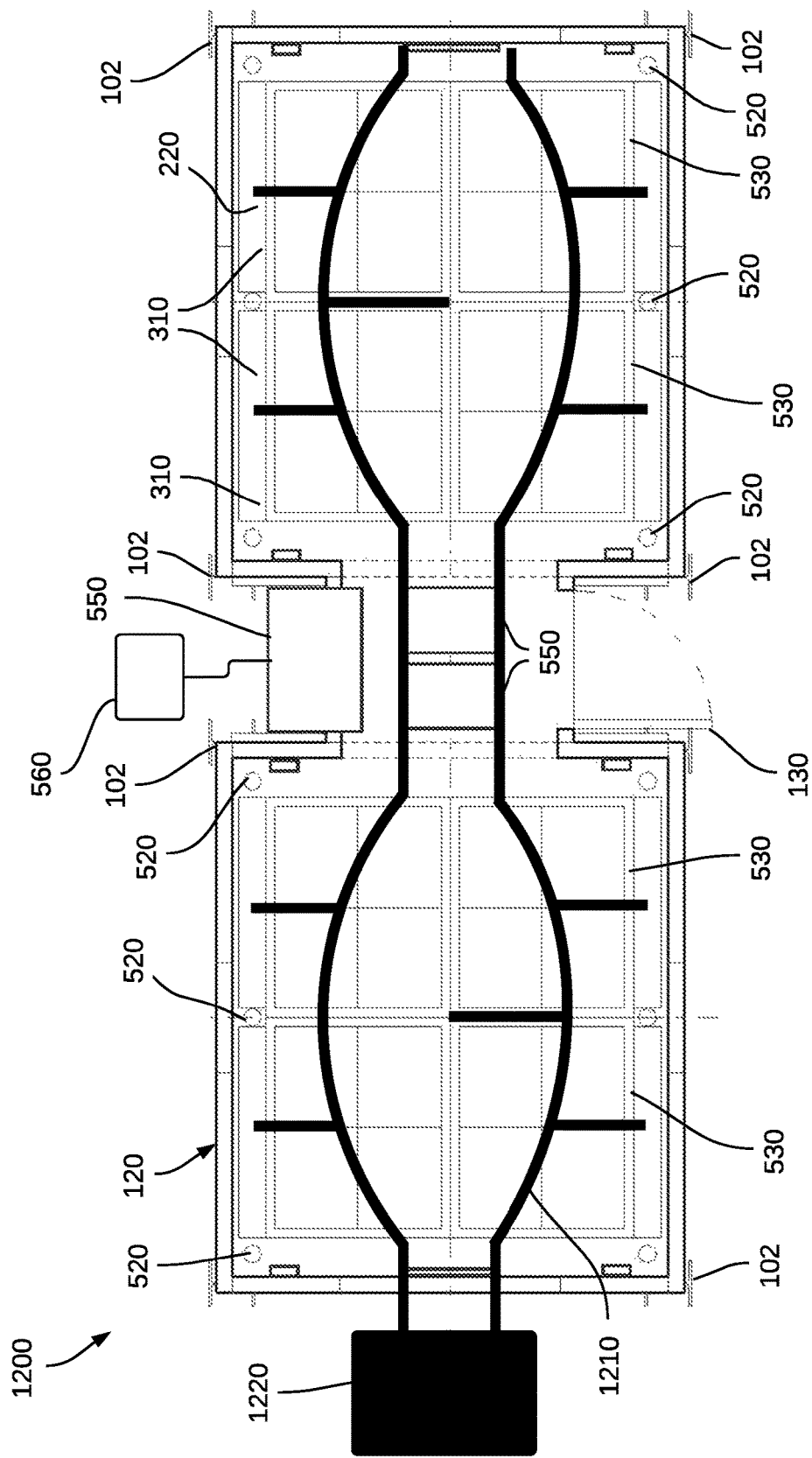
FIG. 12 shows a top, cutaway view of the MICA system, shown here to illustrate an exemplary placement configuration of ductwork and a refrigeration unit, in accordance with an embodiment.

FIG. 12 shows a top, cutaway view of the MICA system, shown here to illustrate an exemplary placement configuration of ductwork and a refrigeration unit, in accordance with an embodiment. As shown in FIG. 12, a MICA system 1200 includes a system of ductwork 1210 attached to a refrigeration unit 1220. Ductwork 1210 complements the workings of HVAC components 550 to send cold air to specific locations among the hive boxes stored within the MICA system. Optionally, refrigeration unit 1220 can be replaced by a heating system, a combination heating/cooling system, and/or a humidification control unit, depending on the needs of the specific installation location.

Figure 13:
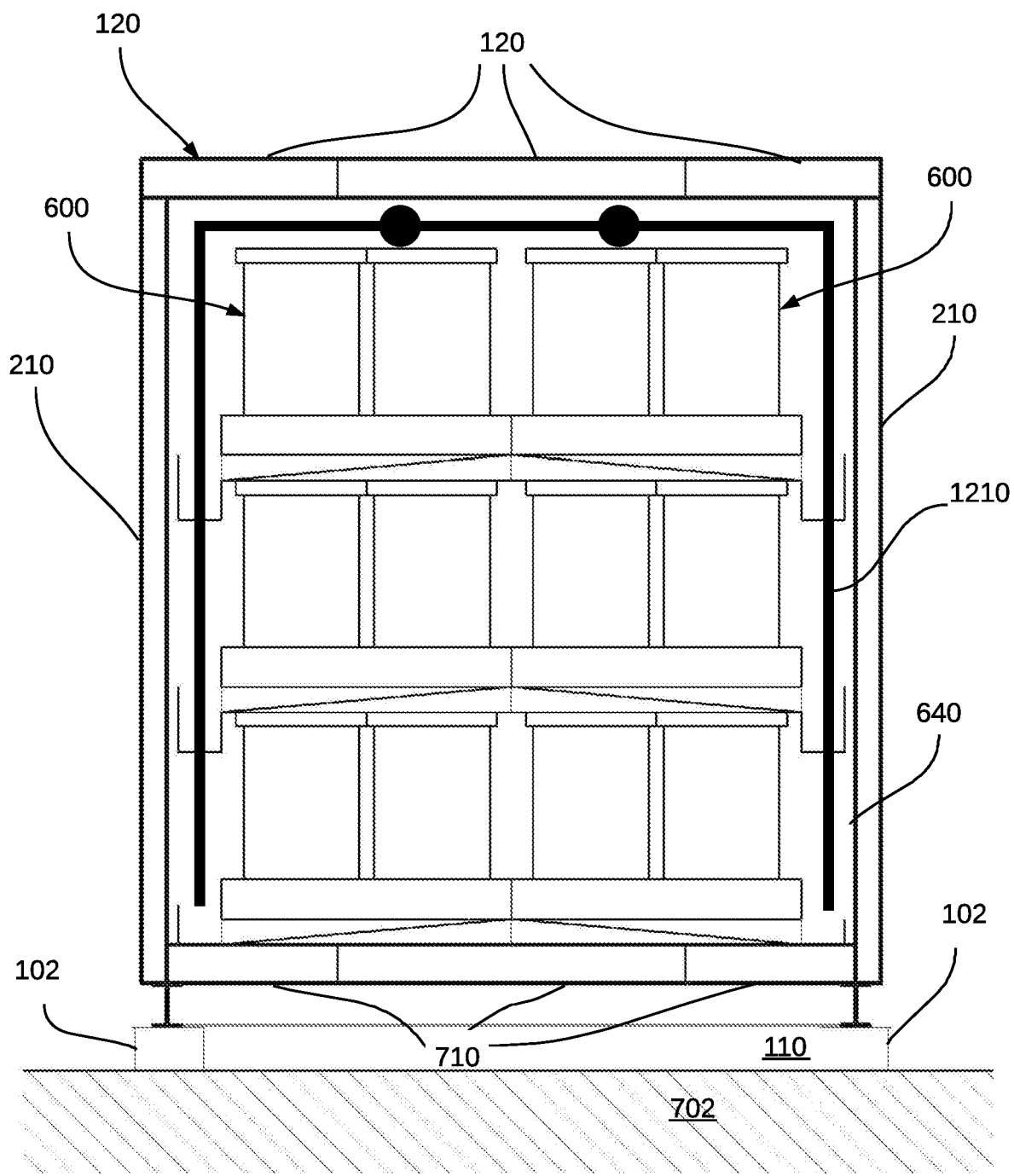
FIG. 13 shows an end, cutaway view of the MICA system, shown here to illustrate an alternate view of the ductwork configuration of FIG. 12, in accordance with an embodiment.

FIG. 13 shows an end, cutaway view of the MICA system, shown here to illustrate an alternate view of the ductwork configuration of FIG. 12, in accordance with an embodiment. In the example embodiment shown in FIG. 13, ductwork 1210 extends to near the bottom of the stack of hive boxes 600 so as to provide cold (or warm) air in the lower regions of the MICA system.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A mobile indoor controlled apiary system for accommodating a plurality of hive boxes therein, each one of the plurality of hive boxes containing at least one colony of honeybees therein, the system comprising:
    a mobile foundation;
    a plurality of insulated panels configured for modular assembly and disassembly to form a structural envelope on top of the mobile foundation, the structural envelope creating a contained indoor environment for housing the plurality of hive boxes therein;
    a removable shell surrounding the structural envelope;
    a data collection system for gathering environmental data within the structural envelope; and
    a climate control system configured for regulating environmental conditions within the structural envelope for each one of the plurality of hive boxes,
    wherein the data collection system is further configured for providing measurements of system power consumption for use in optimizing at least one of power draw and battery capacity to operate the mobile indoor controlled apiary system.

2. The system of claim 1, wherein the data collection system gathers the environmental data at a plurality of locations within the structural envelope, wherein the environmental data so gathered are provided to the climate control system for actively regulating environmental conditions for the each one of the plurality of hive boxes, and
    wherein the climate control system includes ductwork within the structural envelope for directing air to specific locations among the plurality of hive boxes within the structural envelope of the mobile indoor controlled apiary system according to the environmental data so collected at the plurality of locations within the structural envelope.

3. The system of claim 1, wherein the climate control system is configured for controlling at least one of temperature, humidity, ventilation, and carbon dioxide levels within specified tolerances, in response to the environmental data collected by the data collection system.

4. The system of claim 3, wherein the specified tolerances are selected to create and maintain an optimal climate range to encourage clustering behavior of honeybees contained within the structural envelope.

5. The system of claim 1, wherein each one of the insulated panels includes a frame supporting an internal face and an external face separated by an insulating core, and wherein at least two of the insulated panels are interchangeable and interlocking.

6. The system of claim 5, wherein each one of the plurality of insulated panels is configured to be attachable to each other in a weathertight manner without additional attachment hardware.

7. The system of claim 5, wherein the plurality of insulated panels are configured to be repeatably assembled and disassembled.

8. The system of claim 1, wherein the removable shell is configured to be weather resistant.

9. A mobile indoor controlled apiary system for accommodating a plurality of hive boxes therein, the system comprising:
    a plurality of insulated panels configured for modular assembly and disassembly to form a structural envelope for containing the plurality of hive boxes therein;
    a mobile foundation for supporting the structural envelope;
    a data collection system for gathering environmental data within the structural envelope;
    a climate control system configured for regulating environmental conditions within the structural envelope; and
    a control system for controlling the data collection system and the climate control system,
    wherein, based on data collected by the data collection system, the control system automatically adjusts the climate control system to provide the environmental conditions within predetermined set points for each one of the plurality of hive boxes to create and maintain optimal climate range to encourage clustering behavior of honeybees contained within each of the plurality of hive boxes in the structural envelope,
    wherein the climate control system includes ductwork for directing air to specific locations among the plurality of hive boxes within the mobile indoor controlled apiary system.

10. The system of claim 9, wherein the predetermined set points include a temperature setting below 10° C.

11. The system of claim 9, wherein the predetermined set points include a temperature setting in a range of 5° C. to 6° C. and a humidity setting of less than 65% relative humidity within the structural envelope.

12. The system of claim 9, further comprising a removable shell surrounding the structural envelope.

13. The system of claim 9, wherein each one of the insulated panels includes a frame supporting an internal face and an external face separated by an insulating core.

14. The system of claim 9, wherein at least two of the insulated panels are interchangeable and interlocking.

15. The system of claim 9, wherein a portion of the plurality of insulated panels are interchangeable.

* * * * *